United States Patent [19]

Tanibata

[11] Patent Number: 5,563,984
[45] Date of Patent: Oct. 8, 1996

[54] METHOD AND APPARATUS FOR PRINTING IMAGES

[75] Inventor: Tohru Tanibata, Wakayama, Japan

[73] Assignee: Noritsu Koki Co., Ltd., Wakayama, Japan

[21] Appl. No.: 207,672

[22] Filed: Mar. 9, 1994

[30] Foreign Application Priority Data

Mar. 10, 1993 [JP] Japan .................. 5-049377

[51] Int. Cl.$^6$ ........................................... G06K 15/00
[52] U.S. Cl. .................................... 395/105; 355/40
[58] Field of Search ....................... 395/105, 101; 355/41, 77, 40; 358/302, 524, 452, 449

[56] References Cited

U.S. PATENT DOCUMENTS

| | | | |
|---|---|---|---|
| 4,903,068 | 2/1990 | Shiota | 355/20 |
| 4,933,773 | 6/1990 | Shiota et al. | 358/302 |
| 4,951,086 | 8/1990 | Hicks | 355/41 |
| 5,184,227 | 2/1993 | Foley | 358/302 |
| 5,204,707 | 4/1993 | Harvey | 354/75 |
| 5,289,229 | 2/1994 | Manico et al. | 355/41 |
| 5,404,196 | 4/1995 | Terashita et al. | 355/77 |

OTHER PUBLICATIONS

Patent Abstracts of Japan, vol. 12, No. 464(M–771) Dec. 6, 1988.

*Primary Examiner*—Edward L. Coles, Sr.
*Assistant Examiner*—Tracy M. Legree

[57] ABSTRACT

When printing images as ordinary prints on a photosensitive material, index prints are also automatically printed of a same size as the ordinary prints for higher work efficiency. At a projection exposure stage, exposure of a film is effected to obtain ordinary prints using a light source, a lens and a shutter. Also, data of images on the film is read by an optical reader and converted into digital signals. Index prints are then exposed by a PLZT print head which is controlled based on the digital signals.

3 Claims, 12 Drawing Sheets

FIG. 8

| ABC COMPANY GOLD 100 | COMMENTS: | | | |
|---|---|---|---|---|
| 1 | 2 | 3 | 4 | 5 |
| 6 | 7 | 8 | 9 | 10 |
| 11 | 12 | 13 | 14 | 15 |
| 16 | 17 | 18 | 19 | 20 |
| 🚃 21 | 🚗 22 | 🚁 23 | 🐕 24 | |

METHOD AND APPARATUS FOR PRINTING IMAGES

This invention relates to a method and an apparatus for printing both ordinary and index prints when printing on a photographic paper.

On a conventional image printer used to print on a photosensitive material, the material is fed from a supply magazine into a printer body to which a developed film is also fed. The developed film is then exposed by use of a halogen lamp at a photograph exposure stage so that the image on the developed film will be printed on the photosensitive material. After the material has been developed and fixed at the developing unit, it is cut into individual frames and extracted.

With such an image printer, with a roll of film having 12, 24 or 36 frames, it is a common practice to make an index print simultaneously to check the printing data and the image information about the whole roll of film of each customer. A mask exclusively used for index print is inserted in the photograph exposure stage and in the mask the developed film is brought into a close contact with the photosensitive material. Thus, an index print is made by contact exposure.

With such a conventional image printer, the film had to be set in the special mask every time an index print is to be made. This work is troublesome and results in poor working efficiency. Since each frame image is contact-exposed for index print, an index print of the same size as an ordinary print cannot be obtained. Also, the index print does not look good because the frame line of the film is also is exposed to the light. Both the ordinary print and the index print cannot be obtained automatically and continuously.

It is an object of the present invention to provide a method and an apparatus for printing images in which good-looking index prints can be automatically obtained without the need of setting the film into the special mask.

According to the present invention, there is provided a method for printing images comprising the steps of printing an ordinary print by exposing images on a film onto a photosensitive material while optically reading data on the film image and converting the data to digital electric signals, and printing at least one index print of images contained in one roll of film based on the digital electric signals.

In this method, when an index print is printed, the electric signals are corrected according to the number of frames of the film and the size of exposure to change the size of each film image on the index print. Also, if different formats are contained in the film image, the electric signals are corrected to form different kinds of index prints in accordance with the formats.

According to the present invention, there is also provided an apparatus for printing images comprising a projection exposure means for exposing a film image to a photosensitive material for an ordinary print, a reading means for scanning data of the projected film image and converting the data to digital electric signals, a control means for controlling objects to be controlled based on the electric signals, and a digital exposure means for digitally exposing the data on the photosensitive material in response to command signals from the control means, thereby index-printing images contained in one roll of film on at least one print.

In this case, the control unit may include a data converter means for converting the size of the film image according to the number of frames of the film and the size of exposure.

According to the method and the apparatus for printing images in the present invention, an index print is printed on the front or rear end of the photosensitive material by the digital exposure means while the ordinary size print is printed by the projection exposure means. Thus, unlike the conventional method in which each frame of the film is directly contact-printed, an index print of a predetermined size can be automatically obtained regardless of the size of the film. Also, there is no need to set the film in a special mask. This markedly improves the working efficiency. Also, the appearance of the index print improves.

Other features and embodiments will become apparent from the following description taken with reference to the accompanying drawings, in which:

FIGS. 7–10 are views showing several examples of index prints;

Figure 1:
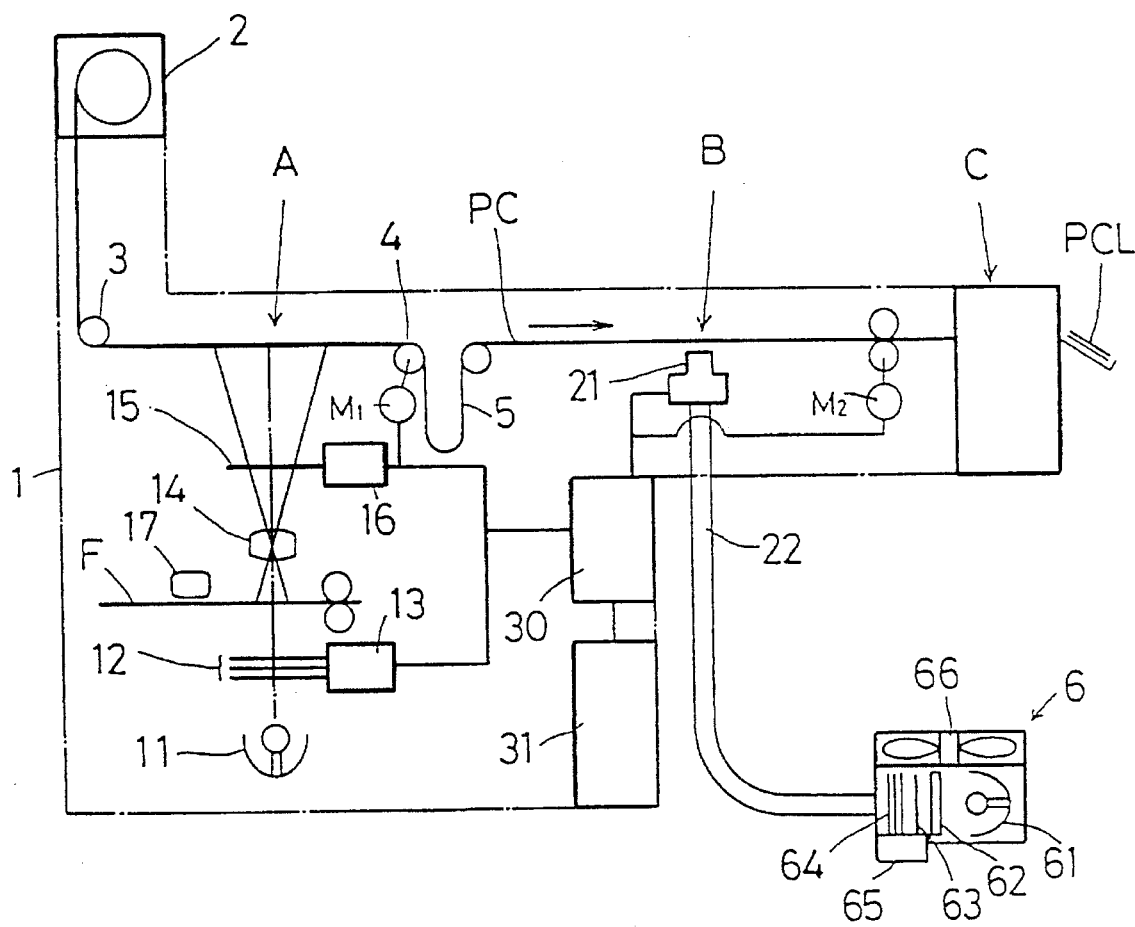
FIG. 1 is a schematic view showing one embodiment of image printer according to the present invention.

Referring to FIG. 1, an image printer of the preferred embodiment comprises a printer body 1 to which a photosensitive material PC is supplied from a magazine 2. The material PC is fed through a projection exposure stage A and a digital image exposure stage B to a developing unit C by means of a feed roller 3, a driving roller 4 and motors M1 and M2. Numeral 5 designates a loop to adjust the processing timing. The digital image exposure stage B is provided to effect exposure for index prints.

The projection exposure stage A is provided with a projection exposure means. The light emitted from a light source 11 of a halogen lamp is adjusted by a light adjustment filter 12 driven by a filter driving member 13. Each frame of a developed film F, separately fed thereto, is illuminated by the adjusted light. The image beam thus obtained is enlarged by a printing lens 14. A mechanical shutter 15 is opened for a predetermined period of time by a driving member 16 so that an image will be printed on the photosensitive material PC.

The film F is read out by an optical reader 17 before or after exposure and the signals from the optical reader 17 are fed to a control unit, which is described later. The optical reader 17 is in the form of an imaging device such as a CCD (charge-coupled device) to read out the image data in each film frame by converting optical signals into electric signals.

The digital image exposure stage B is provided with a PLZT print head 21 which is one example of the digital exposure means. The PLZT print head 21 is illuminated by the light emitted from a light source unit 6 through a bundle of optical fibers 22 to expose the photosensitive material. In the light source unit 6, the light from a halogen lamp as a light source 61 passes through an IR cut filter 62 and a mechanical shutter 63. After being adjusted by a light adjustment filter 64 driven by a driving portion 65, the light is conveyed through the optical fiber bundle 22. Numeral 66 designates a cooling fan.

Figure 3:
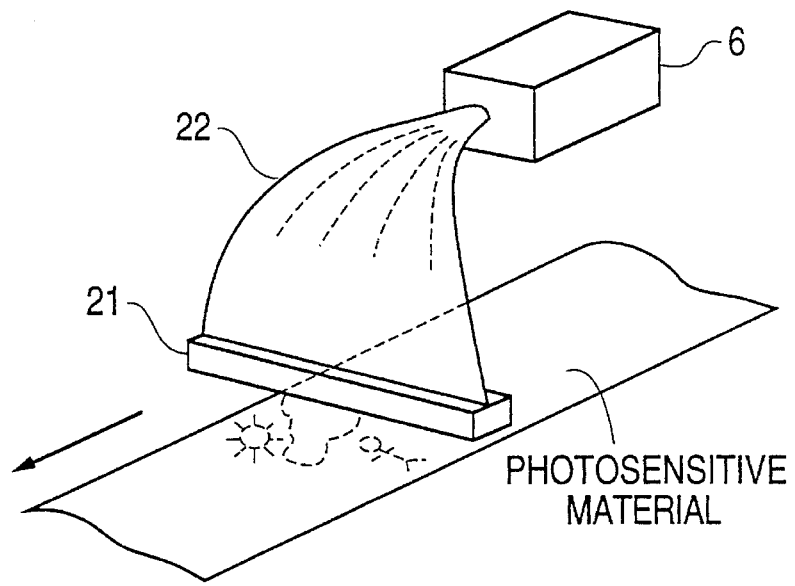
FIG. 3 is a schematic view showing how the PLZT print head operates.
Figure 4:
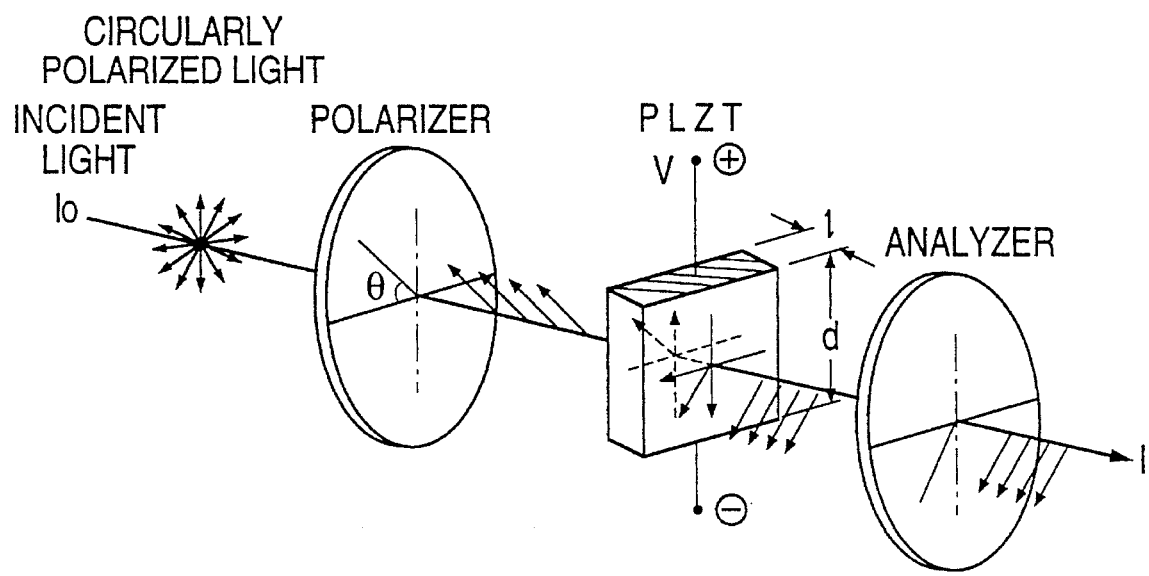
FIG. 4 is a schematic view showing the principle of the same.
Figure 5:
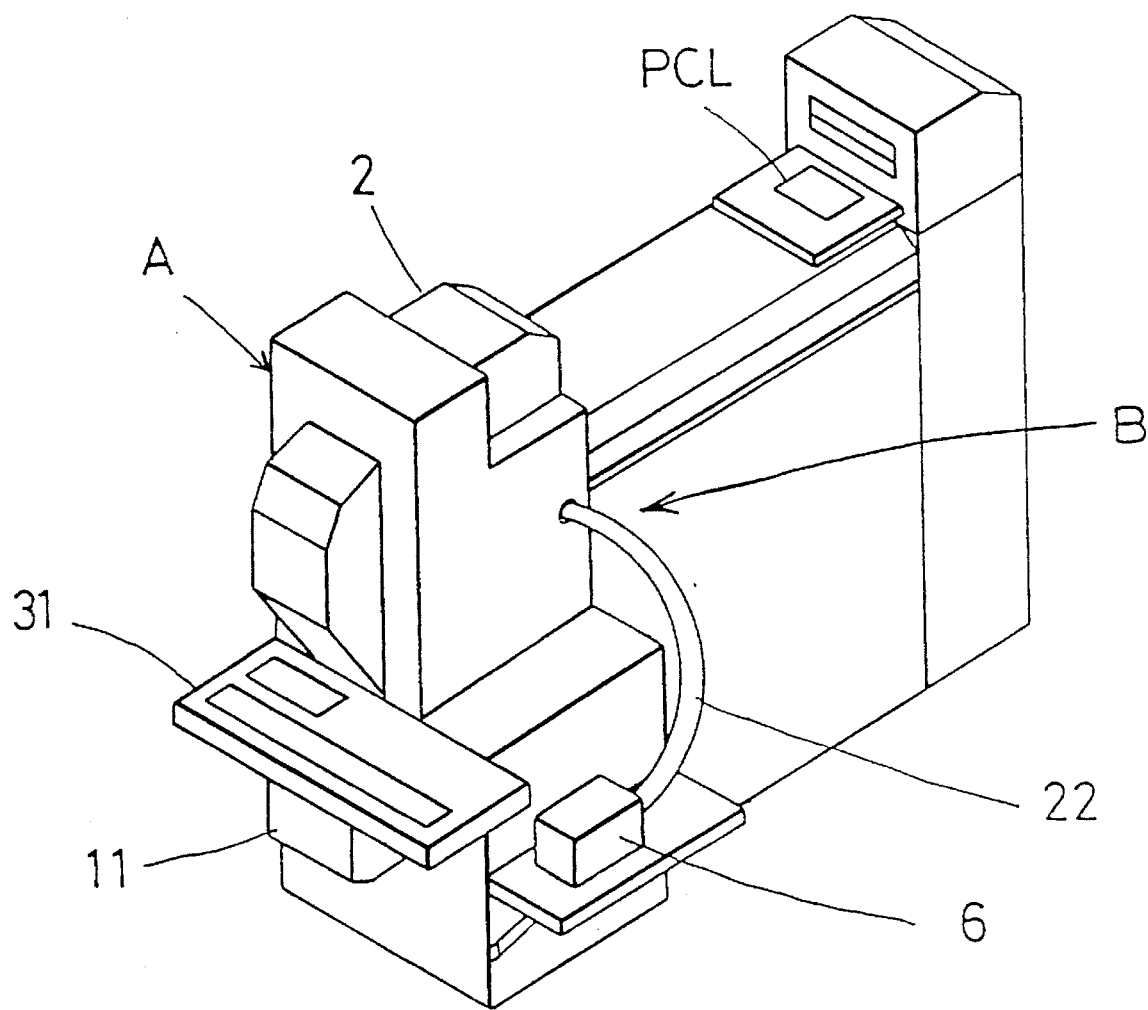
FIG. 5 is a perspective view showing the image printer.

Now the PLZT print head 21 will be described briefly with reference to FIGS. 3 and 4. As an electrooptical element having an electrooptical effect in which birefrigence changes with respect to the applied voltage, there is known a PLZT crystal represented by the formula $(Pb_{1-x}, La_x)(Zr_y, Ti_{1-y})_{1-x/4}O_3$. PLZT is a transparent ferroelectric ceramic and its birefrigence changes with respect to the applied voltage based on the electrooptical effect. Therefore, when PLZT is disposed between a pair of polarizing elements arranged so as to have their polarized surfaces perpendicular to each other and light passes through PLZT after being linearly polarized by the inlet polarizing element, the polarization changes, and the outlet polarizing element emits only the light element corresponding to its polarizing direction.

The light modulation function as described above is used as a light shutter. A PLZT print head comprises the PLZT light shutters one-dimensionally arrayed in a crosswise direction of the photosensitive material to a width longer than the width of the photosensitive material.

By controlling the feed timing of the photosensitive material and the illumination timing of the PLZT print head 21, it is possible to expose any image of one film on the photosensitive material.

In the embodiment, the light source unit 6 is provided outside the printer body. Thus, the heat of light source 61 will not affect the sensitivity of the photosensitive material. The exposure means at the digital image exposure stage B is transfer exposure using a PLZT print head in this embodiment, but it may be transfer exposure or stop exposure using a CRT or liquid crystal element. In the stop exposure, conveyance of the photosensitive material is stopped.

Figure 2:
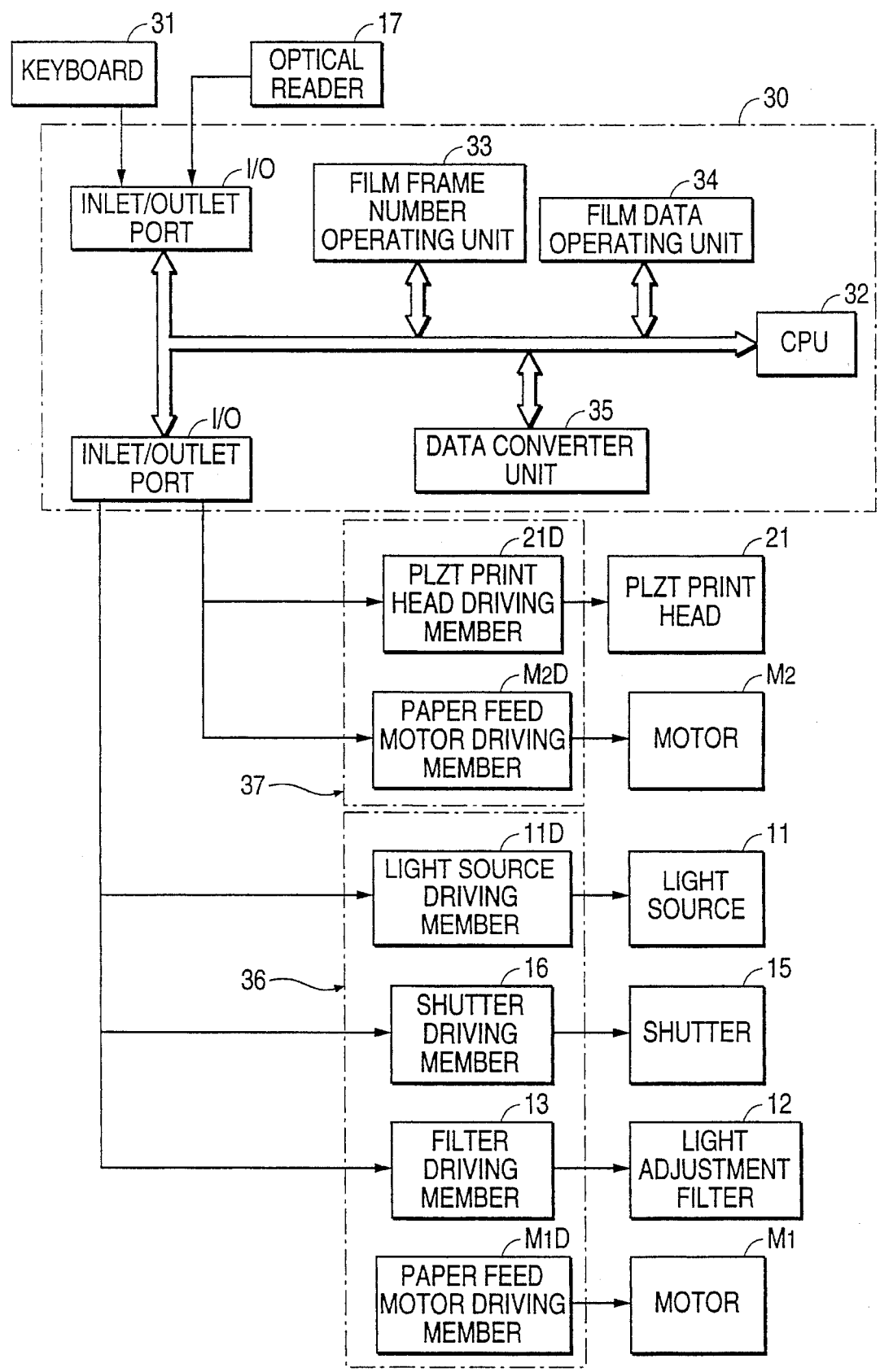
FIG. 2 is a block diagram of the control unit.

A control unit 30 is shown in FIG. 2. Numeral 31 designates a key board as an input device. The signal supplied from the optical reader 17 is transmitted through an input/output port I/O to a CPU (central processing unit) 32 which controls all commands provided in the control unit 30. Numeral 33 is a film frame number operating unit, 34 is a film data operating unit, and 35 is a data converter unit for image data and index data.

The control unit 30 controls an exposure driving unit 36 of the projection exposure stage A and an exposure driving unit 37 of the digital image exposure stage B. The exposure driving unit 36 comprises a light source driving member 11D, the filter driving member 13, the shutter driving member 16, and a paper feed motor driving member M1D. The exposure driving unit 37 includes a PLZT print head driving member 21D, and a paper feed motor driving member M2D.

Figure 6:
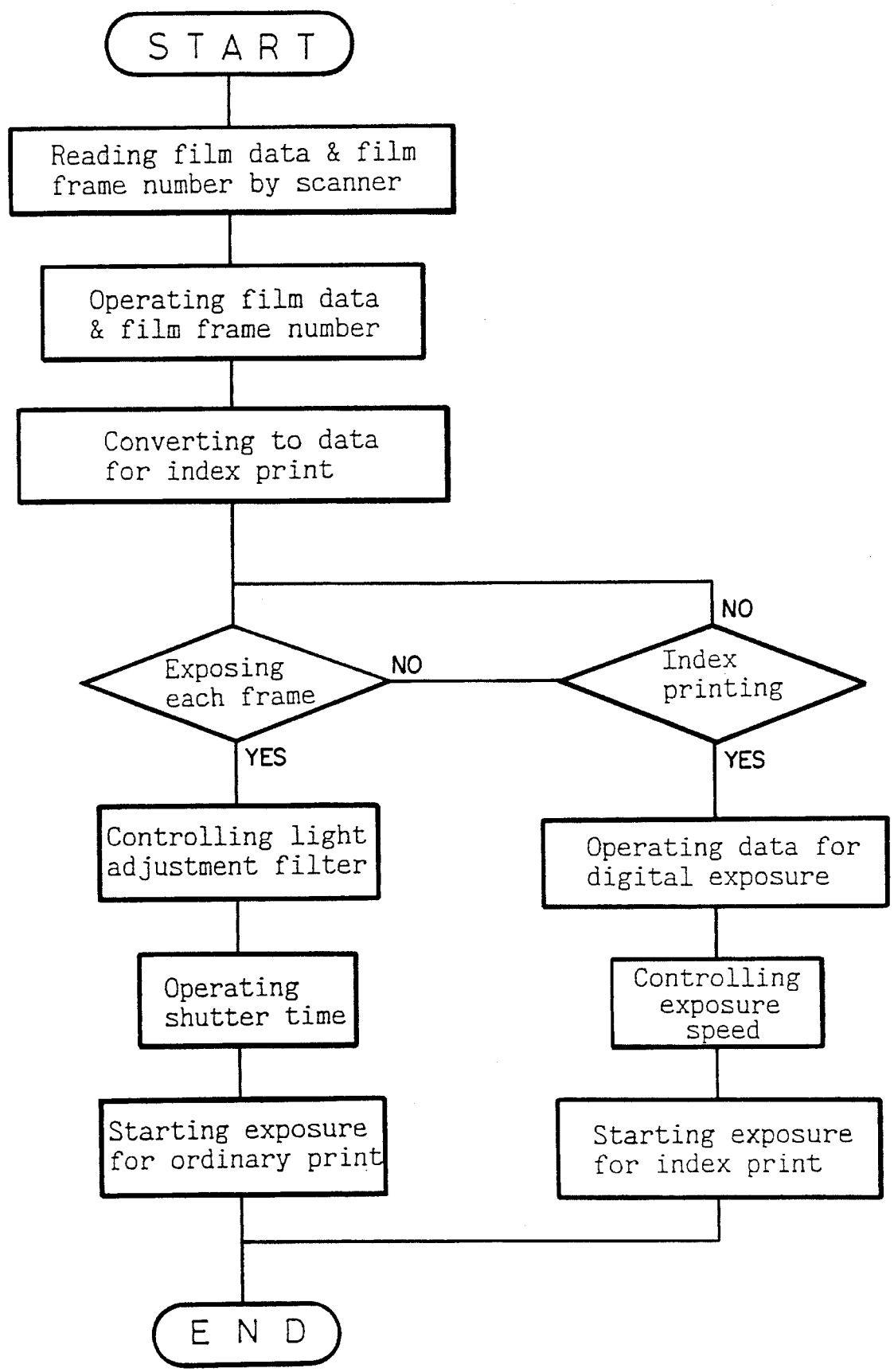
FIG. 6 is a control flow chart of the same.

The operation of the image printer described above is illustrated on the self-explanatory flow chart of FIG. 6.

The photosensitive material PC released from the magazine 2 is fed to the projection exposure stage A by means of the motor M1 and stopped. The photosensitive material PC is exposed to the image on the developed film F through the printing lens 14. The operation of the light modulation filter is well known, and its description thus is omitted.

The photosensitive material PC is then fed to the digital image exposure stage B through the loop 5 by means of the motor M2 and exposed by the PLZT print head 21 while it is being fed. The light for exposure is conveyed from the light source unit 6 provided outside of the printer body through the bundle of optical fibers 22.

After exposed at the digital image exposure stage B, the photosensitive material PC is fed to the developing unit C and then cut into each frame. Prints PCL are thus made.

The data, transfer-exposed at the digital image exposure stage B, includes data inputted by the key board 31 as an input device, data recorded in the film F when photographs are taken, data corrected by reading the image data on the film F, and data (such as frame number) pre-recorded in the frame F.

Figure 7:
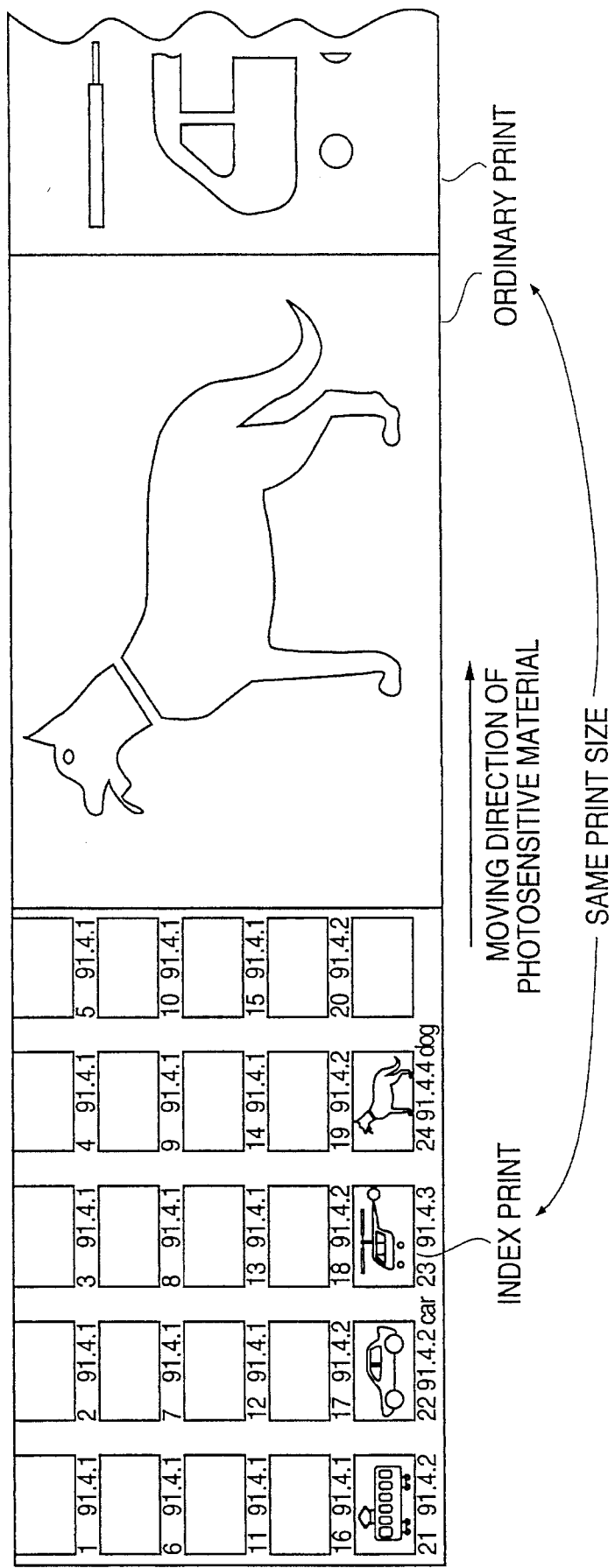
Figure 8:
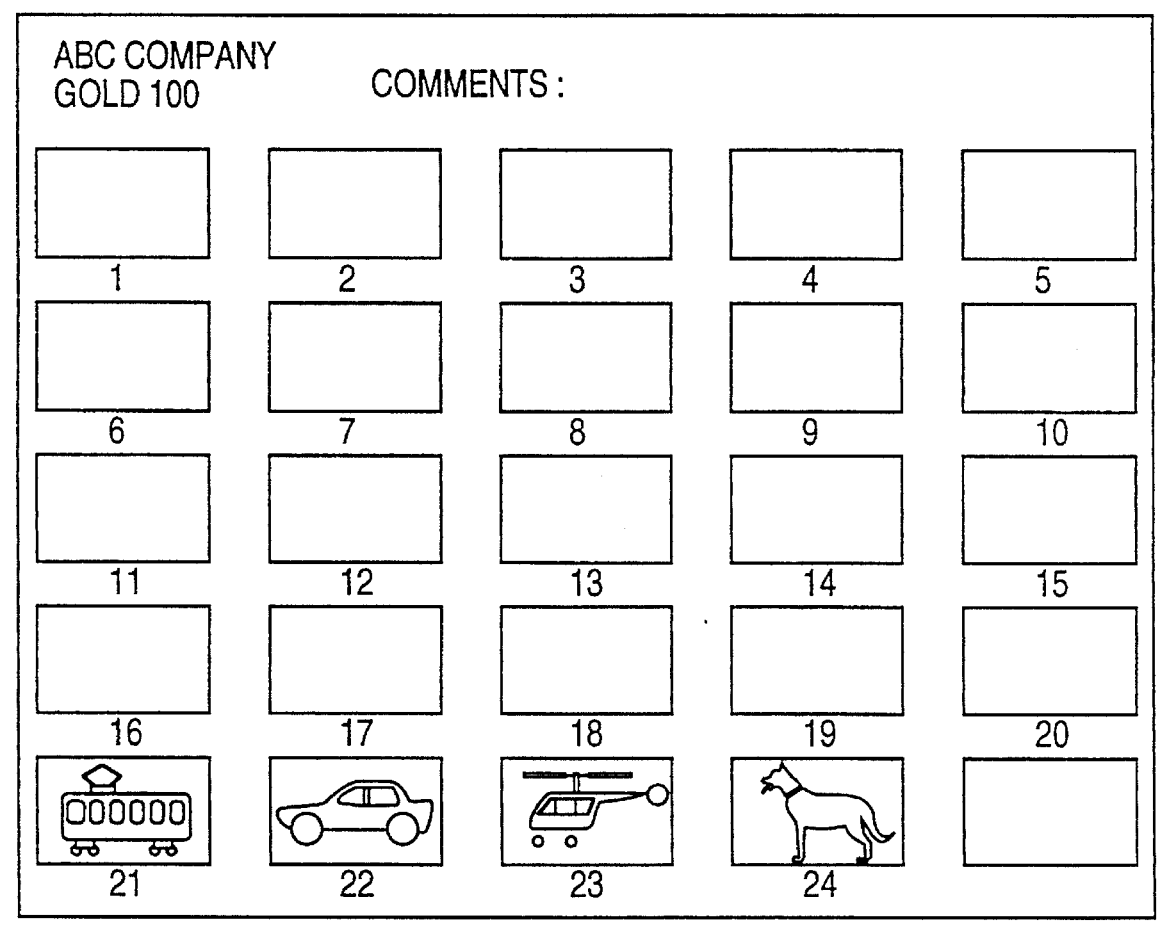
Figure 9:
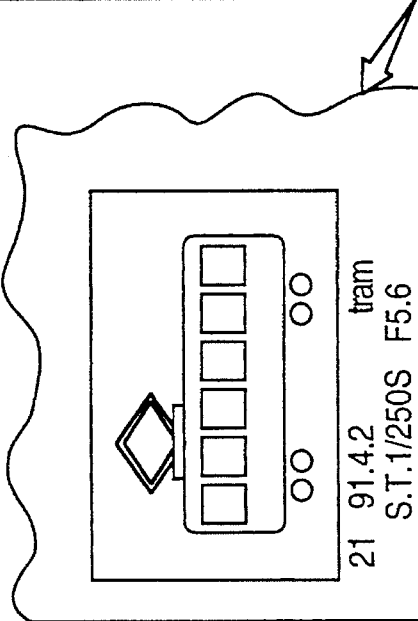
Figure 10:
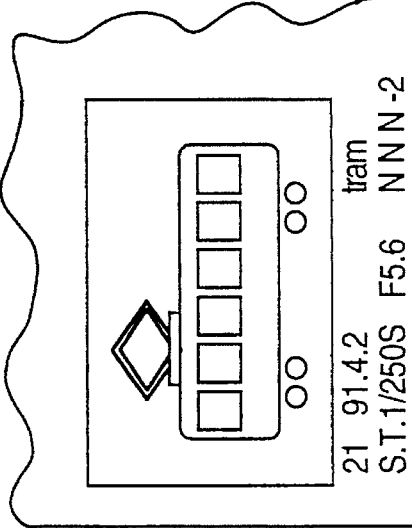

FIG. 7 shows an example of the index print printed on the rear end of one roll of film. FIG. 8 shows an example containing pre-recorded data such as a film manufacturer, grade, frame number, etc. FIG. 9 shows another example containing data such as photographing condition, date, title, etc., recorded in the film when photographs are taken. FIG. 10 shows another example containing data such as printing condition, title, etc., inputted during printing and development.

Figure 11:
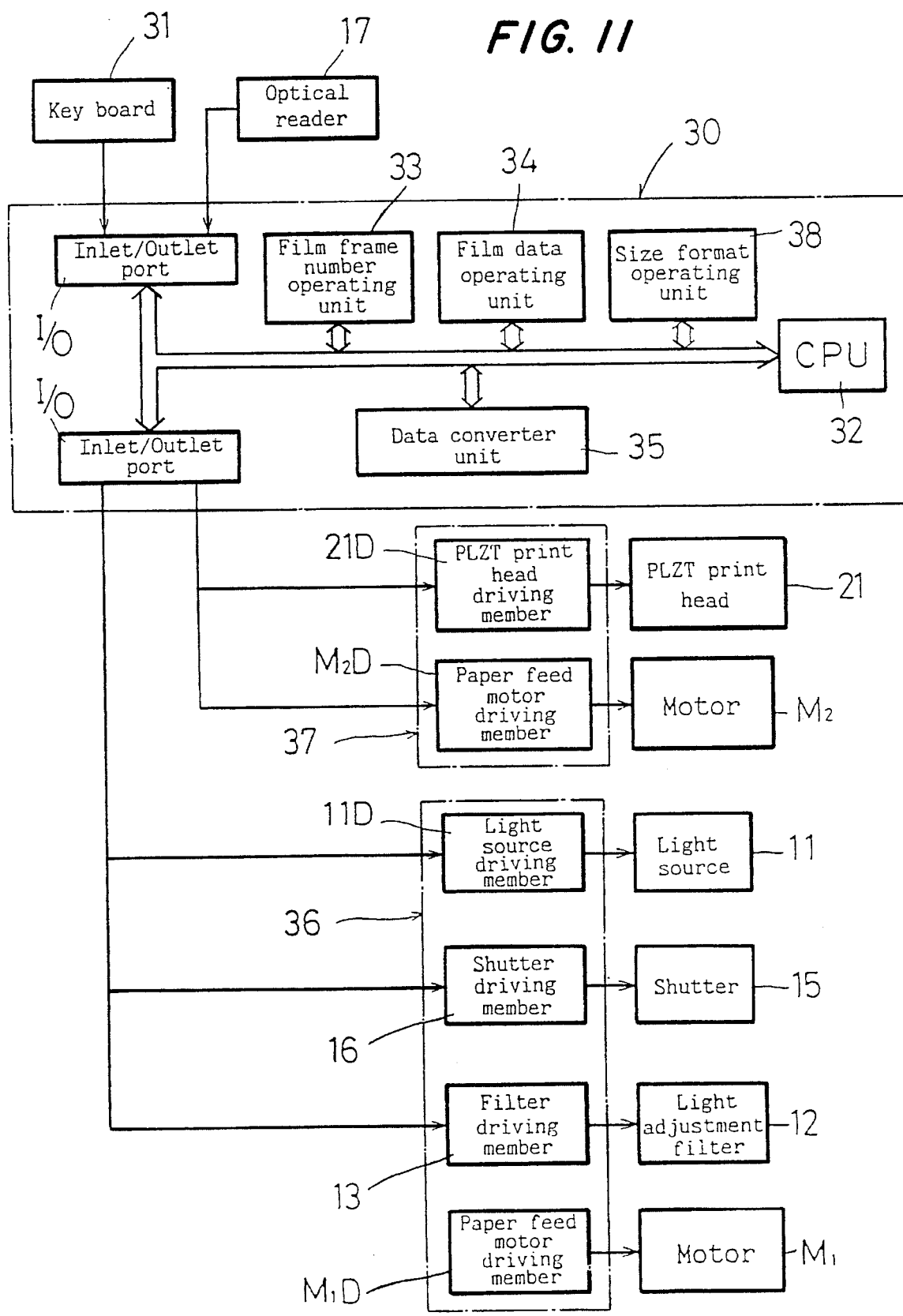
FIG. 11 is a block diagram of the control unit of another embodiment.
Figure 12:
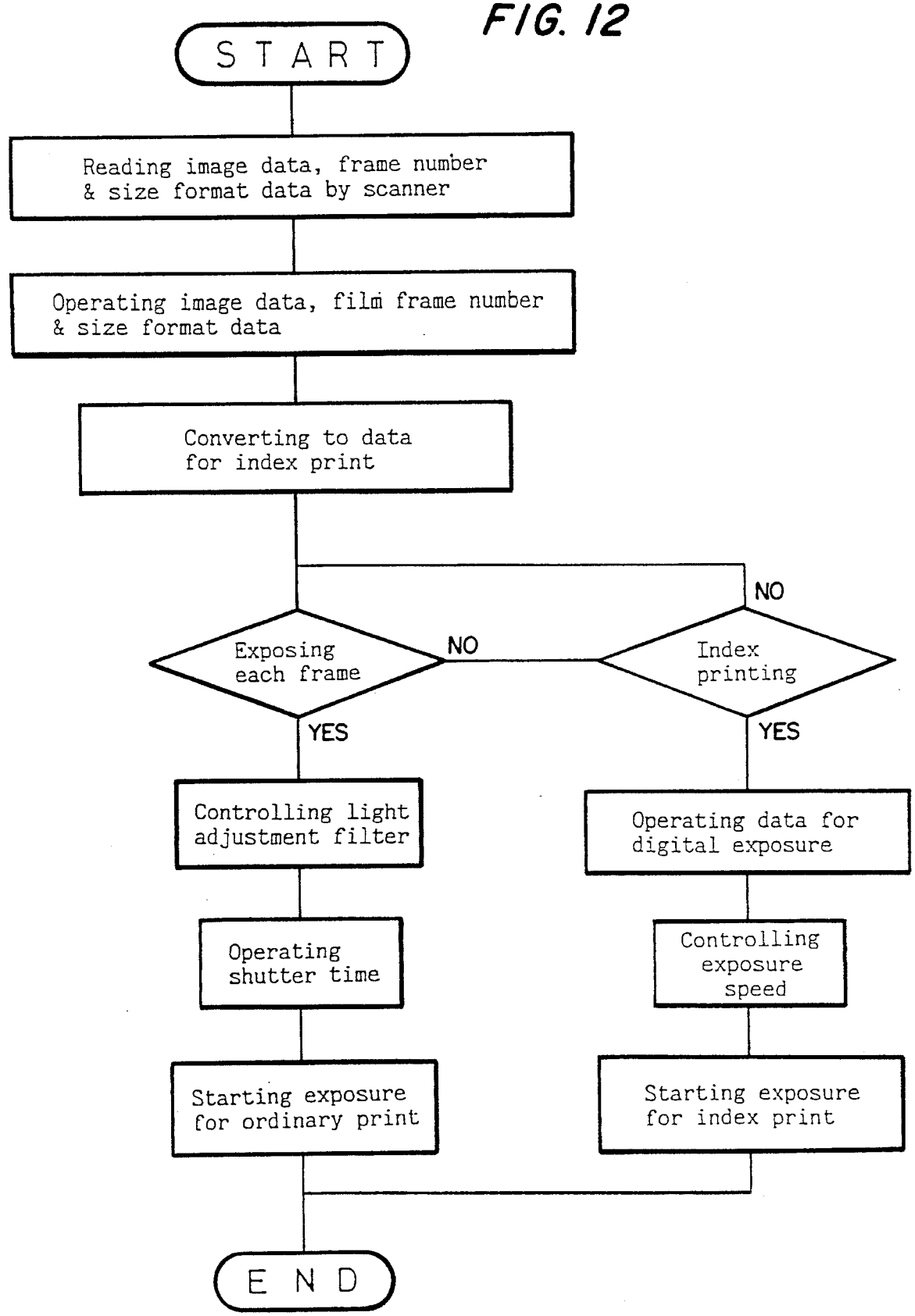
FIG. 12 is a control flow chart of the same.

FIGS. 11 and 12 show an image printer of the second embodiment. The structure of this image printer is basically the same as in the first embodiment except that a size format operating unit 38 is added. Accordingly, the flow chart of FIG. 12 differs from that of FIG. 6 only with respect to reading and data operation functions.

The size format operating unit 38 is provided so that index prints can be prepared even if the film to be printed contains both standard size images and panorama size ones or even if it contains panorama size images exclusively.

Figure 13A:
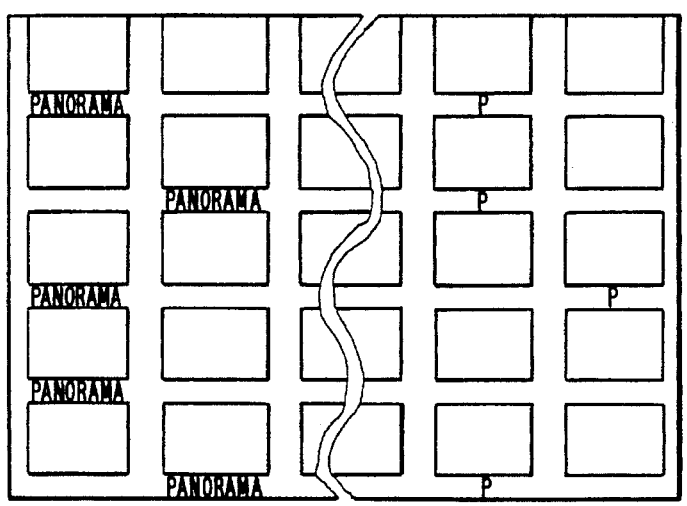
FIG. 13 is a view showing the index print in which the ordinary and panorama size films coexist.

As shown in FIG. 13A, in the case where standard and panorama sizes coexist in one print, frames of the panorama size are exposed and printed with a character or mark by the print head 21 to indicate that it is a panorama size. The mark exposed is not limited to the one shown in the figure as far as it is distinguishable.

Figure 13B:
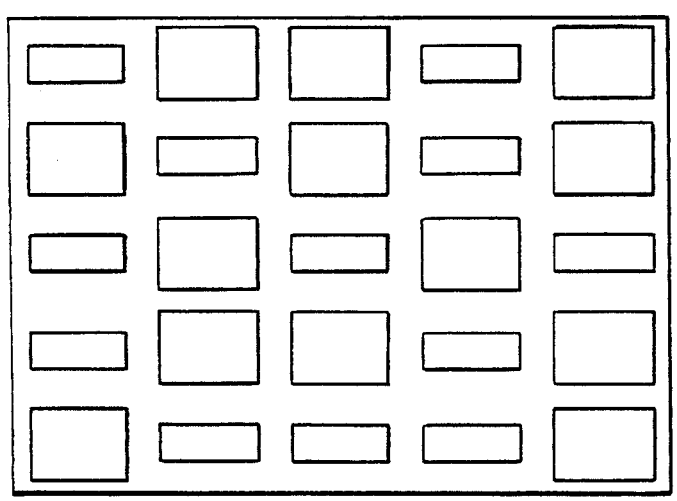
Figure 13C:
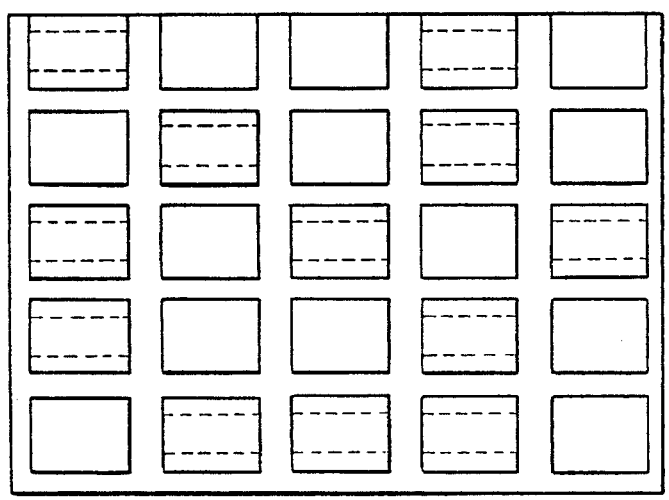

In FIG. 13B, standard and panorama sizes are mixed, and different formats are used to print according to the image sizes. When printing the panorama size, the mark or character shown in FIG. 13A is printed together. In FIG. 13C, the standard and panorama sizes coexist and lines (dotted lines in the figure) are included in the print to indicate that they are panorama sizes.

What is claimed is:

1. A method for printing images comprising the steps of:

printing an ordinary print by exposing film images contained in a roll of film onto a photosensitive material while optically reading data of the film images and converting the data in digital electric signals; and printing at least one index print of the film images contained in the roll of film based on the digital electric signals;

wherein the digital electric signals are corrected according to a number of frames of the roll of film and a size of exposure to change a size of each film image on the index print.

2. A method of printing images as claimed in claim 1, wherein when different formats are contained in the film images, the digital electric signals are corrected to form different kinds of index prints in accordance with the different formats.

3. An apparatus for printing images, comprising:

a projection exposure means for exposing film images of a roll of film to a photosensitive material to obtain an ordinary print;

a reading means for scanning data of the film images and converting the data in digital electric signals;

a control means for issuing command signals based on the digital electric signals; and a digital exposure means for digitally exposing said data on said photosensitive material in response to the command signals from said control means so as to effect index-printing of the film images contained in the roll of film on at least one print;

wherein said control means comprises a data converter means for converting a size of the film images of the index-printing according to a number of frames of the roll of film and a size of exposure.

* * * * *